March 4, 1958  E. C. OLSON  2,825,148

LINT TRAP FOR LAUNDRY DRIER

Filed June 9, 1955

INVENTOR.
EINER C. OLSON
BY
Wheeler, Wheeler & Wheeler
ATTORNEYS

United States Patent Office 2,825,148
Patented Mar. 4, 1958

2,825,148

LINT TRAP FOR LAUNDRY DRIER

Einer C. Olson, Milwaukee, Wis.

Application June 9, 1955, Serial No. 514,301

16 Claims. (Cl. 34—75)

This invention relates to a laundry lint trap.

Traps have been used to collect paint and other products but laundry lint picked up in the air streams from laundry driers has been a frequent cause of fires. Lint, being wettable, and so light in weight as readily to be entrained in the air, creates somewhat different problems. Also, there are special problems involved when a whole battery of driers or the like is to be serviced by a single collection system and trap. In this respect, the invention is broader than laundry usage and may be used where a single trap services a whole series of paint spray booths or other machines having waste products entrained in air.

My preferred installation provides a collecting chamber behind a battery of driers. Each drier has its own blower for sucking heated air through the clothes in the drier. The discharge pipes from the several blowers open into the collection chamber, subject to the control of valves which are biased toward closed position to close the pipe from a given blower as soon as that blower is shut off. This protects the operator handling clothing in a particular drier from blow back of pressure from the other driers in the battery.

The blow-back gate must be constantly washed with water to prevent the lint from adhering thereto as long as the given drier is in operation and its gate is open. Means is provided for automatically shutting off the water which bathes the gate as soon as the gate closes, and for opening a valve to re-establish the supply from this source as soon as the gate opens.

Within the separating chamber there is a trap baffle which extends at its lower margin in close proximity to a bath of water which fills the lower part of the housing. This baffle is also flooded with water over its entire surface as long as the system is in operation. Water flowing down the baffle falls into the bath in the bottom of the housing, which is maintained at a constant level during normal operation. The air deflected by the baffle is projected on to the surface of the bath of water to wet the lint entrained therewith, thereby rendering such lint too heavy to remain entrained in the air as the air passes beneath the baffle and moves toward the escape vent to the outer air.

Water in the bath in the bottom of the chamber is constantly in motion toward the overflow pipe. The lint which is disposed in the water bath moves with the water toward the overflow pipe and is picked up by a screen. The housing is so designed as to facilitate removal of the screen. There is also provision for periodic cleaning of the entire housing.

Figure 1:
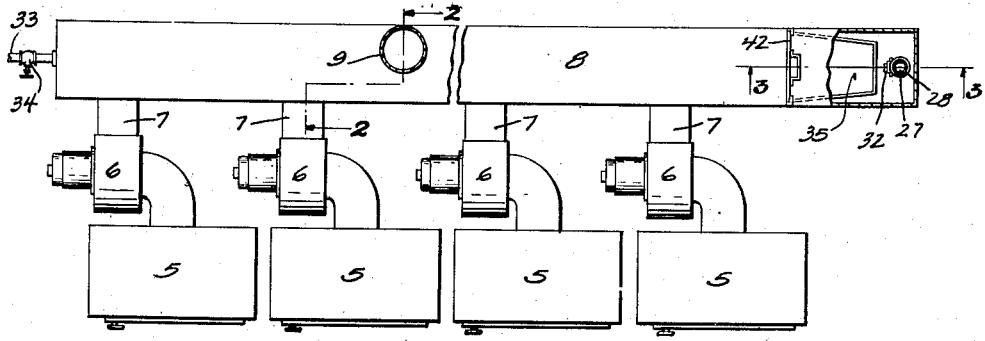
Fig. 1 is a plan view of an installation embodying the invention, portions being broken away.

The battery of driers 5 may comprise any number, four being illustrated. Each drier has its own exhaust blower 6 which draws air through the clothes in the drier and discharges it through pipe 7.

In accordance with the present invention, all of the pipes 7 discharge into a lint collecting chamber 8 which extends behind the driers for the full length of the battery. In practice, this chamber may be about 14 inches by 27 inches in cross section. It will be understood that the particular dimensions are stated merely by way of example, since they are by no means critical.

Figures 2, 3:
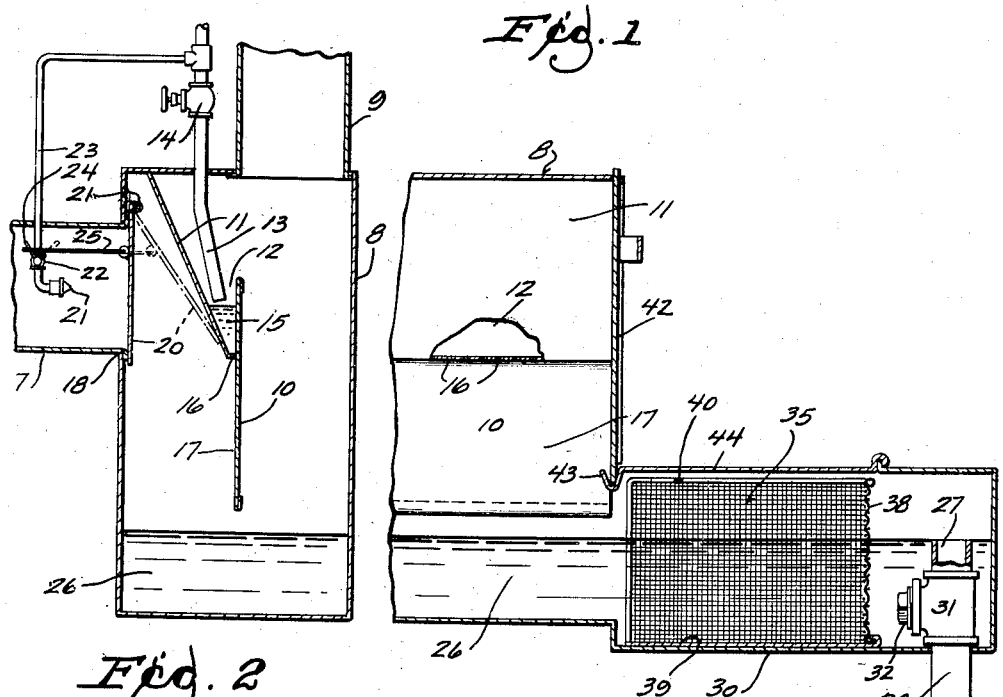
Fig. 2 is a detail view on an enlarged scale taken in section on the line 2—2 of Fig. 1.
Fig. 3 is a detail view on an enlarged scale taken on the line 3—3 of Fig. 1.
Figure 4:
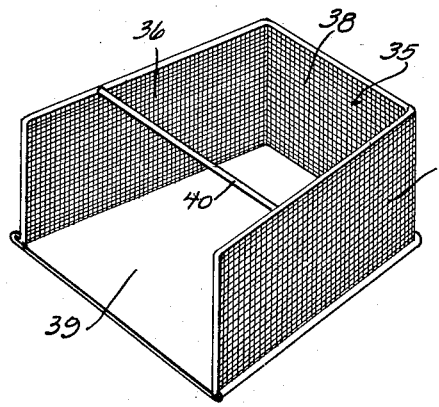
Fig. 4 is a detail view in perspective of the removable lint strainer.

From any suitable point in the top wall of chamber 8 at the rear of the partition baffle hereinafter described leads the vent stack 9, which usually opens to the atmosphere above the roof of the laundry. Extending longitudinally of the chamber at a point intermediate its front and back is a vertical baffle 10 toward which a partition wall 11 is convergent from the front of the chamber as clearly shown in Fig. 2. The lower margin of the partition wall 11 is connected to the baffle 10 at a point below its top to provide a trough at 12 to which water is supplied by pipe 13 subject to the control of valve 14. The flow of water is adjusted so that a substantial body of water will be maintained at all times in trough 12. It is immaterial whether the trough overflows the baffle but a substantial depth of water at 15 is desired for proper distribution of the water to serve all of the ports 16 which are closely spaced along the bottom of the trough as best shown in Fig. 3. The water discharged from the several ports 16 bathes the front surface 17 of baffle 10 to keep a film of water which coats the entire exposed surface 17 and is flowing down it at all times during operation of the system.

The discharge end portion 18 of each of the blower discharge pipes 7 is flanged inside the chamber 8 to provide a seat for the blow-back gate 20 with which each individual blower is provided. This gate is hinged at 21 near its upper margin, to be biased by gravity toward its seat 18. When the blower is in operation, its pressure opens the gate to the position indicated at dotted lines in Fig. 2 so that the air and lint is deflected downwardly along baffle 17. Desirably the partition baffle is so located as to act as a stop to limit the outward movement of the gate to the oblique position in which the gate acts as a downward deflector.

Desirably the gate surface exposed to the air and lint is also bathed in a film of downwardly flowing water. This is provided by a nozzle 21 which jets spray forwardly with the air and lint toward the surface of the gate. A shut-off valve 22 controls the supply pipe 23 which leads to nozzle 21. The valve has an operating lever 24 connected by link 25 with the gate to be moved between the closed position shown in full lines in Fig. 2 and the open position shown in dotted lines in Fig. 2, as the blowback gate is closed or open. The closing of the gate automatically shuts off the water supply to nozzle 21. The opening of the gate automatically establishes the jet of spray from that nozzle.

Water flowing down the gates and the baffle 10 is collected in a bath 26 in the sump portion or bottom of the collecting chamber 8. The top end 27 of the drain 28 is at such a level as to maintain perhaps three to five inches of water in the chamber. While the depth is not important, it is important that the level be maintained in close proximity to the lower margin of baffle 10. A spacing of about 1½ inches is found appropriate, although it may be varied.

At one end of the chamber 8 the chamber has an extended portion 30 with a slightly dropped bottom. This extension serves as a clean-out box. It is from the extension 30 that the drain pipe 28 opens. A T 31 in the drain pipe has a removable plug 32 which, upon removal, will take water from a level sufficiently low to drain chamber 8 completely. This is used particularly for flushing the chamber, a separate flushing pipe 33 controlled by valve 34 being provided in the end of the chamber remote from the clean-out box 30.

Within the clean-out box I provide a lint collecting strainer 35. In its preferred embodiment, this strainer has convergent foraminous sides 36 and 37 and a foraminous rear wall 38. Screen cloth may be used. There being no advantage in making the bottom of screening, the bottom 39 may be solid sheet metal. A rod 40 across the top of the strainer serves as a handle to facilitate its removal. The purpose of the convergent side walls 36, 37 is to permit free flow of water laterally through these walls, unimpeded by proximity to the sides of the chamber extension.

Above the point of connection of box 30 with chamber 8, the end wall 42 of the chamber comprises an upwardly removable slide which, in its lower position seats in a channel 43 provided in the removable top 44 of the clean-out box. By withdrawing the slide upwardly, the top member of the clean-out box is released and can be lifted out to give access to the strainer, which may thereupon be drawn through the resulting opening in the box. A jet of water from the clean-out pipe 33 will wash the whole interior of chamber 8, including the bottom surfaces exposed by the removal of plug 32, to drain the water from the sump. In consequence of the effective action of the device, the air passing from the stack 9 is virtually completely free of lint. Yet the amount of water required is extremely small.

While water has been referred to as the lint wetting and collecting agent, and is preferred for reasons of economy, it will be understood that for many purposes other liquids can be substituted equivalently and, in some aspects, or for special purposes, may be preferred.

I claim:

1. The combination with a laundry drier having an open circuit air circulating system including an exhaust blower, and a vent to discharge air to the atmosphere, of means for trapping lint entrained with air blown from the drier toward the vent, said means comprising a separating chamber into which the blower discharges and from which the vent opens, said chamber comprising a liquid receptacle and a baffle for deflecting air and lint from the blower downwardly against the surface of liquid in the receptacle, said baffle being interposed between the vent opening from the chamber and the point of connection of the blower therewith and having an edge spaced from said liquid surface for passage of air from which lint has been separated between the baffle and liquid en route to said vent.

2. The device of claim 1 in further combination with means for maintaining a film of liquid flowing on the surface of the baffle for the wetting of lint coming in contact with the baffle.

3. The device of claim 1 in further combination with a spray nozzle having a discharge opening directed into the flow of air and lint from the blower to said chamber for the wetting of lint entrained in the air to increase its weight and facilitate its separation.

4. The combination with a laundry drier having a blower, and a vent pipe, of means for trapping lint entrained with air blown from the drier toward the vent pipe, said means comprising a separating chamber into which the blower discharges and from which the vent pipe opens, said chamber comprising a liquid receptacle and a baffle for deflecting air and lint from the blower against the surface of liquid in the receptacle, said baffle being interposed between the vent pipe opening from the chamber and the point of connection of the blower therewith, said baffle comprising a partial partition intermediate the front and back of the chamber and to which a partition wall is convergent at the top of the chamber and to an intermediate portion therewith to provide a trough between said wall and baffle, said trough having numerous openings in its bottom and having liquid supply connections adapted to maintain a substantial body of liquid in the trough for uniform flow through the several openings, said trough and liquid supply constituting means for providing a film of liquid on the face of the baffle.

5. The device of claim 1 in which said chamber is provided with an overflow pipe having its inlet at a substantial level above the bottom of the chamber to maintain a body of liquid in the chamber in proximity to the lower margin of the baffle and a removable lint collecting basket having foraminous wall portions and extending across the chamber and provided with an open mouth to receive flow toward said overflow pipe to catch lint moving with the liquid toward said pipe.

6. The device of claim 5 in which said overflow pipe has a normally closed port at a level to draw all the liquid from the chamber bottom, the chamber being provided at its end remote from said pipe with a flushing pipe having a normally closed valve.

7. The device of claim 6 in which said chamber has a collecting box extension from which the drain pipe opens and which has a bottom downwardly offset below the bottom of the chamber and which has a movable top wall portion through which the lint collecting basket is removable.

8. In the device of the character described, the combination with a battery of devices having individual discharge blowers provided with discharge pipes, of a collecting chamber extending along the battery and with which individual blower discharge pipes communicate, said chamber having a vent stack and means for separating foreign matter from gases delivered by said pipes into the chamber, blow-back gates individual to the respective blower discharge pipes and provided with means mounting them for movement to and from closed positions respecting their several pipes, the said gates being biased toward movement to their respective closed positions and being respectively movable to open positions upon the operation of their respective blowers.

9. The device of claim 8 in which the gates are respectively hinged above the respective pipes to be biased by gravity toward the ends of the respective pipe, the said pipe ends providing seats connected by the respective gates in their movement subject to their gravity bias.

10. The device of claim 8 in which at least one of the blower discharge pipes is provided internally with a nozzle directed toward said gate and a valve controlled fluid pipe leading to said nozzle and motion transmitting means connecting the valve with the gate of the respective pipes whereby the valve is operated by movement of the gate.

11. The device of claim 10, the motion transmitting means being adapted to open the valve in the opening of the gate and to close the valve in the closing of the gate whereby fluid from the nozzle is jetted along the path of discharge from the blower through the gate when the blower is in operation and the gate is open.

12. The device of claim 11 in which the fluid supply pipe has a liquid pressure connection and the nozzle is directed against the face of the open gate to bathe with a film of liquid the face of the gate exposed to effluent from the blower discharge pipe.

13. In a device of the character described, the combination with a vent stack and an elongated collection chamber and a battery of devices disposed along the chamber and each provided with a blower, the said devices having discharge pipes leading to the chamber along one side thereof, the vent stack opening from the other side of the chamber, blow-back gates individual to respective pipes and hinged at their tops to be gravity biased to said pipes and opened by effluent from said pies during the operation of the blowers with which respective devices are provided, partition baffle means within the chamber between the side thereof into which the pipes open and the side thereof from which the vent stack opens, said partition baffle means constituting means in the path of hinged movement of the gates for limiting to oblique positions the outward swinging movement of respective blow-back gates, the gates thereupon serving to deflect effluent from respective pipes downwardly along the partition baffle means toward the bottom of said chamber, the partition baffle means being spaced from the bottom of chamber and the chamber bottom constituting a tank, the chamber having means for maintaining liquid at a predetermined level in the tank in close proximity to and spaced from the lower margin of the partition baffle means, whereby effluent guided by the blow-back gates and partition baffle means downwardly in the chamber is directed against the surface of such liquid before any portion thereof can pass said partition baffle means toward said stack.

14. The device of claim 13 in which the means for supplying liquid includes means for flowing a film of liquid across the surfaces of blow-back gates traversed by effluent from their respective pipes.

15. The device of claim 14 in which said last means comprises nozzles in the respective pipes, valve controlled liquid supply connections to the nozzles, and valve operating linkage connecting respective gates with respective valves for opening and closing respective valves in accordance with opening and closing movements of respective gates.

16. The combination with a laundry drier having a blower and a vent, of apparatus for trapping lint entrained with air blown from the drier toward the vent, said apparatus comprising a separating chamber into which the blower discharges and from which the vent opens, said chamber comprising a liquid receptacle, a baffle disposed transversely to the surface of liquid in the receptacle for deflecting air and lint from the blower downwardly against said surface, said baffle being interposed between the vent opening from the chamber and the point of connection of the blower therewith, said baffle having an edge spaced from said liquid surface for passage of air from which lint has been separated between the baffle and liquid en route to said vent.

References Cited in the file of this patent
UNITED STATES PATENTS

| | | |
|---|---|---|
| 2,521,712 | Geldhof | Sept. 12, 1950 |
| 2,664,646 | Bourner | Jan. 5, 1954 |
| 2,720,037 | Erickson | Oct. 11, 1955 |
| 2,722,057 | Pugh | Nov. 1, 1955 |